United States Patent
Hughes, III

(10) Patent No.: US 6,283,000 B1
(45) Date of Patent: Sep. 4, 2001

(54) FLUID ACTUATED, MAGNETIC BAR STOCK PULLER

(76) Inventor: Odie L. Hughes, III, 4104 Highway 26 W., Bogalusa, LA (US) 70427

( * ) Notice: Subject to any disclaimer, the term of this patent is extended or adjusted under 35 U.S.C. 154(b) by 0 days.

(21) Appl. No.: 09/498,878

(22) Filed: Feb. 7, 2000

(51) Int. Cl.⁷ .............................. B23B 1/00; B23B 13/00
(52) U.S. Cl. .................... 82/1.11; 82/124; 82/126
(58) Field of Search ........................... 82/1.11, 124, 125, 82/126, 127, 120, 121

(56) References Cited

U.S. PATENT DOCUMENTS

| | | |
|---|---|---|
| 2,504,026 | 4/1950 | Krouse et al. . |
| 2,915,682 | 12/1959 | Bower . |
| 3,010,054 | 11/1961 | Goudsmit . |
| 3,079,191 | 2/1963 | Engelsted et al. . |
| 3,875,830 * | 4/1975 | Lechot ................................. 82/126 |
| 4,057,881 * | 11/1977 | Stephens .............................. 29/27 C |
| 4,401,960 | 8/1983 | Uchikune et al. . |
| 4,614,137 | 9/1986 | Jones . |
| 4,742,740 * | 5/1988 | Hasslauer et al. ..................... 82/127 |
| 4,924,738 | 5/1990 | Che . |
| 5,080,380 | 1/1992 | Nakagawa et al. . |
| 5,165,313 * | 11/1992 | Karr ....................................... 82/127 |
| 5,845,950 | 12/1998 | Stowe et al. . |

* cited by examiner

Primary Examiner—Henry Tsai
(74) Attorney, Agent, or Firm—Joseph T Regard, LTD, plc

(57) ABSTRACT

A magnetic bar stock puller for a CNC type, numerically controlled turret lathe, the magnetic bar puller configured to engage and pull bar stock for positioning same. In the preferred embodiment of the present invention, the bar puller has a body having an engaging end and a mounting end, the mounting end mounted to a station on the rotary turret. The bar puller is actuated by fluid pressure from liquid coolant flowing from the cooling system of the lathe, the coolant passing through a longitudinal bore in the body of the unit so as to urge a piston, having a high field strength magnet, to migrate within the longitudinal bore towards the engaging end of the bar holder, so as to provide a magnetic field in the vicinity of the engaging end, to selectively engage a bar or other ferrous object in the vicinity of the engaging end of the bar puller. A spring bias is provided to urge the piston away from the engaging end of the bar holder, removing the magnetic field from the vicinity of the engaging end, when fluid pressure ceases due to cessation of flow of coolant through the system.

10 Claims, 6 Drawing Sheets

FLUID ACTUATED, MAGNETIC BAR STOCK PULLER

TECHNICAL FIELD OF THE INVENTION

The present invention relates to bar stock feed mechanisms, and in particular to a bar puller accessory for mounting upon the rotary turret of a numerically controlled lathe, the magnetic bar holder configured to engage and pull bar stock for machining same on demand.

In the preferred embodiment of the present invention, the bar puller has a body having an engaging end and a mounting end, the mounting end configured to be removeably mounted to a station on the rotary turret.

The bar puller is actuated by fluid pressure from liquid coolant flowing from the cooling system of the lathe, the coolant passing through a longitudinal bore in the body of the unit so as to urge a piston, having a high field strength magnet, to migrate within the longitudinal bore towards the engaging end of said bar holder, so as to provide a magnetic field in the vicinity of the engaging end, to selectively engage a bar or other ferrous object in the vicinity of the engaging end of the bar puller.

A spring is provided to urge the piston away from the engaging end of the bar holder, removing the magnetic field from the vicinity of the engaging end, when fluid pressure ceases due to programmed cessation of flow of coolant through the system.

BACKGROUND OF THE INVENTION

The prior art has contemplated a multitude of bar pullers and magnetic holders or the like, although none are believed to contemplate, teach, or otherwise suggest the device of the present invention.

A list of patents which may have some pertinence to the present invention include:

| U.S. Pat. No. | Inventor | Date of Issue |
| --- | --- | --- |
| 2915682 | Bower | 12/01/1959 |
| 3010054 | Goudsmit | 11/21/1961 |
| 3079191 | Engelsted et al | 02/26/1963 |
| 4401960 | Uchikune et al | 08/30/1983 |
| 4924738 | Che | 05/15/1990 |
| 5080380 | Nakagawa et al | 01/14/1992 |
| 5115702 | Link | 05/26/1992 |
| 5165313 | Karr | 11/24/1992 |
| 5845950 | Stowe et al | 12/08/1998 |
| 5960689 | Warren | 10/05/1999 |

U.S. Pat. No. 3,079,191 dated Feb. 26, 1963, teaches a "Permanent Magnet Lifting Device" including a housing having first and second ends, the first end configured to engage a support, the second end configured to form the work piece engagement end. The housing has formed therethrough a bore having slidably situated therein, a magnet housed in a piston (in this case, two bores and two pistons), with a magnetic surface facing the second end of the housing. A cap is provided at the second end to form a work piece contact surface. Further provided is means to motivate the piston/magnet arrangement within the bore to and away from the work piece contact surface at the second end of the housing, so as to engage/disengage the work piece.

U.S. Pat. No. 2,915,682 issued 1959, which also includes spring (30) to provide spring bias to the system. Another example may be found in 4,401,960, entitled "Magnet Assembly". Lastly, U.S. Pat. No. 5,845,950 teaches a "Pneumatically Actuated Magnetic Article Holder" having some relevance to the above patents, but teaching fluid actuation to motivate the magnet means.

The above patents are distinguishable from the present, searched for invention, as they do not teach a bar puller, although it is possible that one or more of the above devices might be able to be modified to perform as such. For other magnetic holders, see U.S. Pat. No. 5,080,380 for a "Magnetic Chuck" assigned to Murata Manufacturing, Inc., teaching multiple pistons in a housing, the pistons forming magnets, which are motivated to move to and from a work piece surface via compressed air. This patent is relevant in that, in addition to the concept of providing a work piece holder utilizing a piston having a magnet which is motivated to and away from the work surface, this patent also teaches the concept of utilizing fluid pressure to accomplish same.

U.S. Pat. Nos. 4,924,738, 5,165,313, and 5,960,689 provide examples of bar puller patents.

GENERAL SUMMARY DISCUSSION OF THE INVENTION

The present invention teaches a bar puller as may be utilized in a computerized, numerically controlled lathe, milling machine or the like, wherein the unit is preferably mounted to a station on the rotary turret of the lathe, the turret generally having a plurality of stations for the mounting of machine tools thereon, which are selectively utilized by rotating the turret so that the chosen station may be positioned for machining the bar, stock, or other work piece held in position by the lathe's collet or spindle chuck.

The bar puller of the present invention comprises a body or housing having first and second ends, the first end comprising a mounting shank configured to engage a support bracket on the rotating turret of the lathe, the second end configured to form the work piece engagement end. It is noted that the mounting shank may vary depending upon the configuration of the tool mount of the lathe, or may be otherwise mounted to the unit.

The housing has formed therethrough an longitudinal bore, such that the first end further includes fluid engagement means for receiving fluid (coolant) under pressure. Further provided in the bore, slidably situated therein, is a magnet housed in a piston such that a magnetic surface is projected towards the second end of the housing.

The piston has a spring bias provided by a spring situated within the longitudinal bore, the spring having first and second ends, the first end communicating with an anchor pin situated within the bore in the vicinity of the first end of the housing, the second end affixed to the piston. The piston further has a clearance relative to the inner walls of the bore to allow the passage of coolant therebetween.

A cap is configured to cover the second end of the longitudinal bore to form the work piece contact surface, the cap having formed therein a fluid escape passage.

In operation, the bar puller relies upon programmed operation of the CNC lathe to direct the actions involving the unit. The bar puller is mounted to a station in the rotary turret, which is selectively positioned by the operating program directing the lathe to rotate into position, and maneuvering same adjacent to the bar stock. The work piece contact surface is selectively provided with a strong magnetic field by applying fluid pressure into the longitudinal bore of the body of the unit through the mounting shank via coolant flow through the first end of the housing and longitudinal bore, the coolant flow providing a hydraulic pressure sufficient to overcome the spring bias and urging the piston and magnet adjacent to the cap at the second end of the longitudinal bore. The strong magnetic field thereby generated at the cap is adequate to grasp and pull bar stock or the like.

When it is desired to disengage the work piece, fluid pressure is relieved, and the spring bias urges the piston and magnet away from the cap, withdrawing the magnetic field, and releasing the work piece. The fluid passageway formed in the cap not only projects cooling fluid upon the work piece during milling or machining, it also prevents the accumulation of metal shavings or the like on the work piece contact surface, or within the longitudinal bore or magnet.

The unit is easily installed and detached from the turret station, as necessary for use in generally repetitive operations.

While the prior art searched contemplated a variety of bar pullers and the like, most bar pullers utilized clamps or the like for mechanically grasping the bar stock.

Past bar pullers utilizing a magnet have tended to accumulate shavings or metal debris, the devices being ineffective in selectively initiating or deactivating the magnetic field. An exception is electromagnets, but these units require a power supply and switching system, and thereby were more complicated, expensive, and less reliable than the present system.

The present invention thereby provides an easily implemented, cost effective and reliable bar puller which requires little in the way of maintenance or servicing, may be utilized to pull a variety of diameter bars with no damage to the bar or other feed stock, and which can be easily removed or installed as is necessary with little in the way of adjustments, while having a configuration which may be utilized in conjunction with a variety of size, style, and make CNC lathes or the like.

It is therefore an object of the present invention to provide a magnetic bar puller for a rotary turret lathe which is actuated by coolant fluid pressure.

It is another object of the present invention to provide a magnetic bar puller for a rotary turret lathe which pulls the bar without damaging same.

It is another object of the present invention to provide a magnetic bar puller which may be utilized with a variety of make, style and size CNC lathes or the like.

It is another object of the present invention to provide a magnetic bar puller which requires little in the way of maintenance or adjustments, and which does not accumulate shavings.

It is another object of the present invention to provide magnetic bar puller which is actuated by fluid pressure from the lathe coolant system.

Lastly, it is an object of the present invention to provide a method and system for pulling a bar in a rotary turret, CNC lathe which is effective, utilizes existing equipment components for operations, and requires little in the way of maintenance or adjustments.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Figure 1:
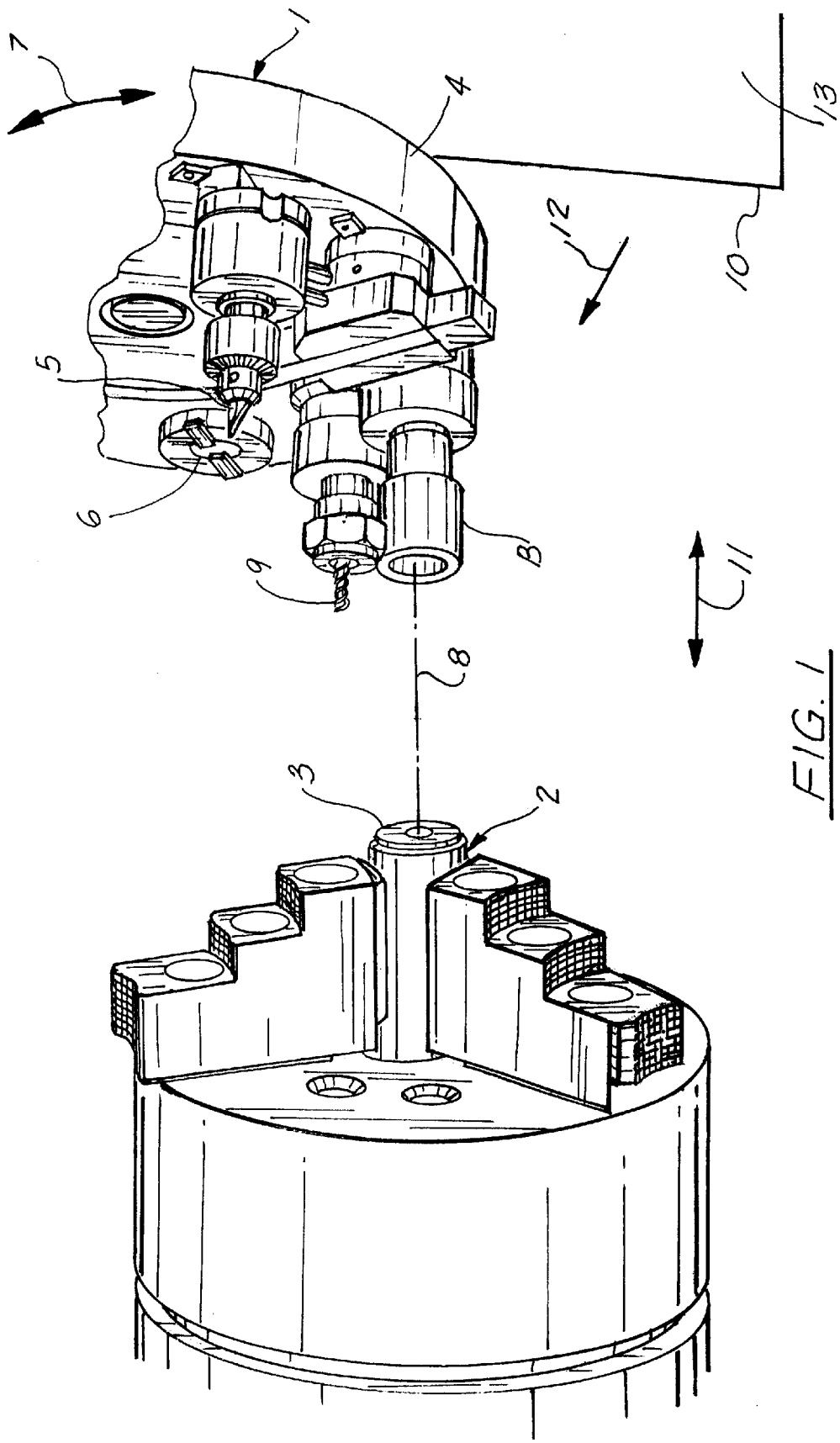
FIG. 1 is a side view of the rotating turret of the CNC lathe of the present invention having the magnetic bar puller installed thereon.
Figure 2:
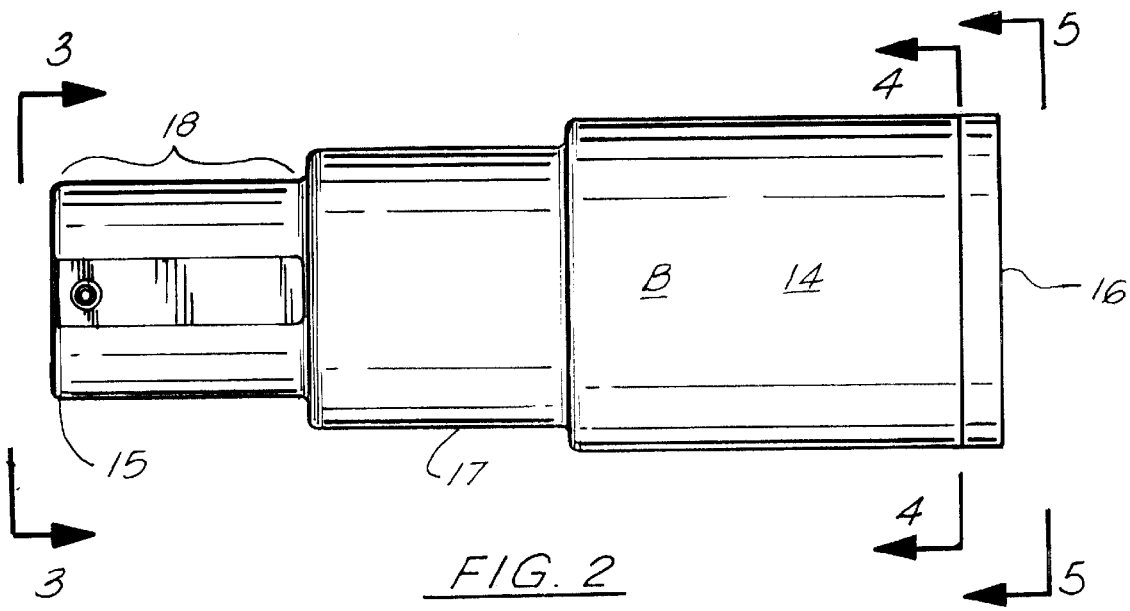
FIG. 2 is a side view of the housing or body of the magnetic bar puller of the preferred embodiment of the present invention.
Figures 3, 4:
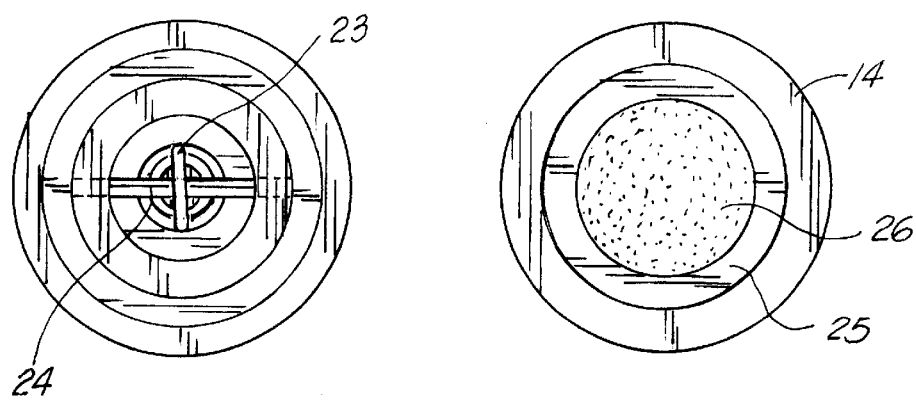
FIG. 3 is an end view of the first end of the magnetic bar puller of FIG. 2.
FIG. 4 is an end view of the second end of the magnetic bar puller of FIG. 2, without the end cap.
Figure 5:
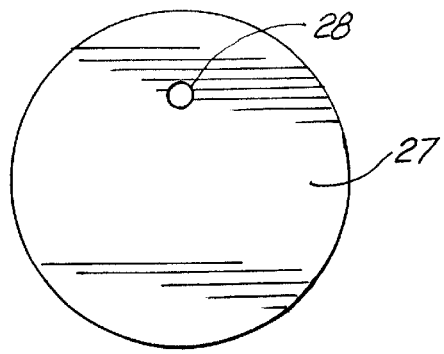
FIG. 5 is an end view of the second end of the magnetic bar puller of FIG. 4, with the end cap.
Figure 6:
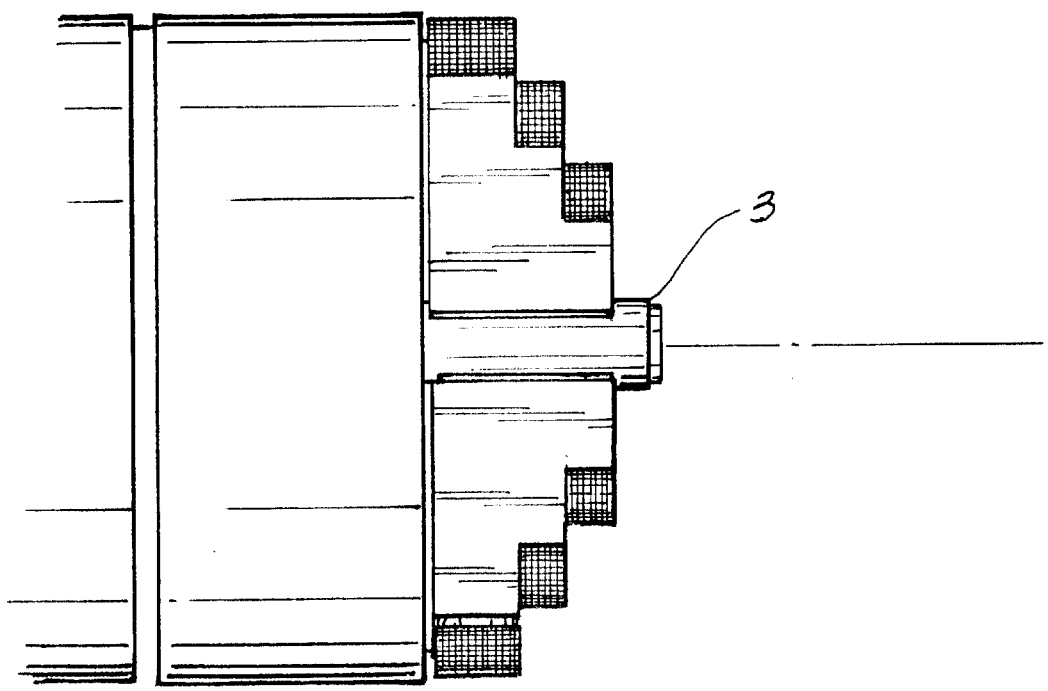
FIG. 6 is a side view of the bar dispensing portion of a CNC, rotary turret lathe.

Referring to FIG. 1 of the drawings, the preferred embodiment of the bar puller B of the present invention is configured to be utilized in conjunction with a numerically controlled turret lathe 1, for pulling a bar 3 comprising elongated bar stock, which is fed through and selectively held by a chuck 2.

Opposite the chuck 2 of the lathe 1 is a turret 4 having multiple tool stations 6 for removeably mounting various tools, such as a drill 9, a cutting tool 5, the bar puller B of the present invention, as well as other attachments. The turret 4 is configured to selectively rotate 7 via instructions from a programmable controller 13, so as to position the desired tool (mounted at the selected tool station), so that same may be utilized for forming a work piece held by chuck 2, the work piece in this case, bar 3. A carriage 10 supports the turret 4, the carriage maneuverable along a first axis 11 (via, for example, a track), the first axis aligned with the longitudinal axis 8 of the lathe 1, as well as a second axis 12, which is perpendicular to, but along the same horizontal plane, as the first axis, so as to position the selected tool in the vicinity of the work piece.

The programmable controller 13, in this case, a computer, controls the lathe, selectively positioning the desired tool mounted to a tool station on the rotatable turret, as well as movement of the carriage along the first and second axis. As shown, the bar puller B of the present invention is rotatably positioned by on the rotating turret 4, which effectively positions the tool to be utilized, which tool is then brought into the vicinity of the work piece via carriage movement along the first and second axis, denoted above.

Continuing with FIGS. 2–5 and FIG. 12, the bar puller B of the preferred embodiment of the present invention comprises a body 14 having first 15 and second 16 ends, and an outer, radial wall 17. As shown, the first end 15 has formed thereon a mounting shank 18 configured to engage a tool station 6' on the rotating turret of the lathe, the body 14 of the bar puller having formed therethrough a longitudinal bore 19 having first 20 and second 21 diameters, the first diameter enclosing a spring 22, and the second diameter 21 forming a piston chamber for slidably enclosing a piston housing 25, as will be more fully disclosed, infra.

Continuing with the figures, the spring 22 has first 23 and second 23' ends, the first end anchored in the vicinity of the first end 15 of the body (within the longitudinal bore) via anchor pin 24, the second end engaging the piston housing 25 so as to urge said piston housing away from said second end 16 of said body, within the second diameter 21 of the longitudinal bore 19.

Figure 12:
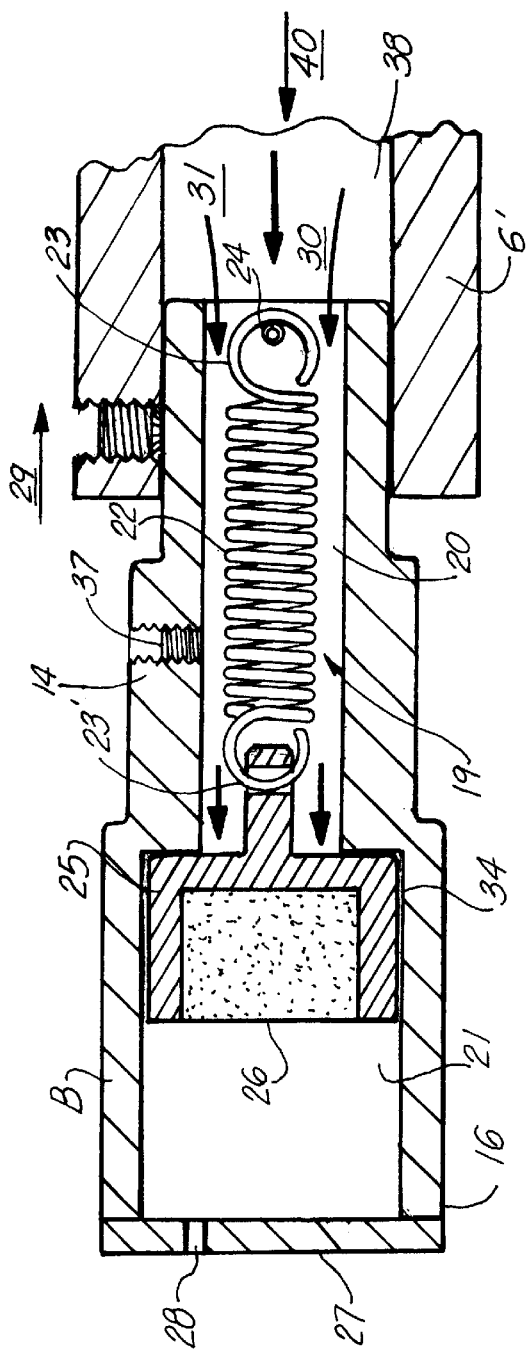
FIG. 12 illustrates fluid pressure from coolant passing through a longitudinal conduit formed through the body of the bar puller, against a spring biased, magnetic piston.

As shown, the piston housing 25 slidingly engages the second diameter 21 of the longitudinal bore, having, for example, about 5 thousandths of an inch clearance. The piston housing contains a magnet 26 directed toward the second end 16 of the body, for example, a rare earth, high gauss field magnet, the magnet of sufficient size and power to pull the bar when situated adjacent thereto. The bar puller is configured such that, when the piston housing and magnet directed away from the second end 16 of the body, as shown in FIG. 12, there is an insufficient electromagnetic field emanating from the second end 16 of the bar puller to engage or pull stock material. A cover 27 formed of non-ferrous metal, such as stainless steel or the like, is provided to facilitate uncoupling of the magnet and prevent the accumulation of debris on the bar puller, the cover having formed therethrough a drain aperture 28, as will be discussed further infra.

As earlier indicated, the bar puller B has a mounting shank 18 associated with the first end 15 of the body 14, the mounting shank configured to engage a tool station 6' on the turret of the lathe.

In the preferred embodiment of the present invention, the lathe has the capability to feed cooling fluid through the tool station 6', where certain tools may utilize said cooling fluid in operations involving said tools. For an example of a lathe with such a feature, the working embodiment of the present invention utilizes a HITACHI brand lathe, model number HT 20SIII, which provides a flow of coolant at up to 40 psi. The coolant flow at the tool station (also referred to as turret pocket) may be provided externally, about the periphery of the tool station to irrigate the tool during operations, or may be provided internally, through the mounting port 38, (referred to as turret coolant flow 40) to facilitate flow of coolant through the tool.

The bar puller of the present invention utilizes the cooling fluid feature provided through the tool station of the lathe to facilitate selective movement of the piston housing, for selectively providing an electromagnetic field to engage bar stock. This is not believed to be an intended use for the turret coolant flow feature, which was to cool the work piece and cutting tool during machining operations. Instead of cutting or cooling, the fluid pressure of the coolant flowing through the bar puller is utilized to urge the magnetic piston towards the second, engagement end of the bar puller on demand, for providing selective magnetic attraction to adjacent bar stock.

Figure 13:
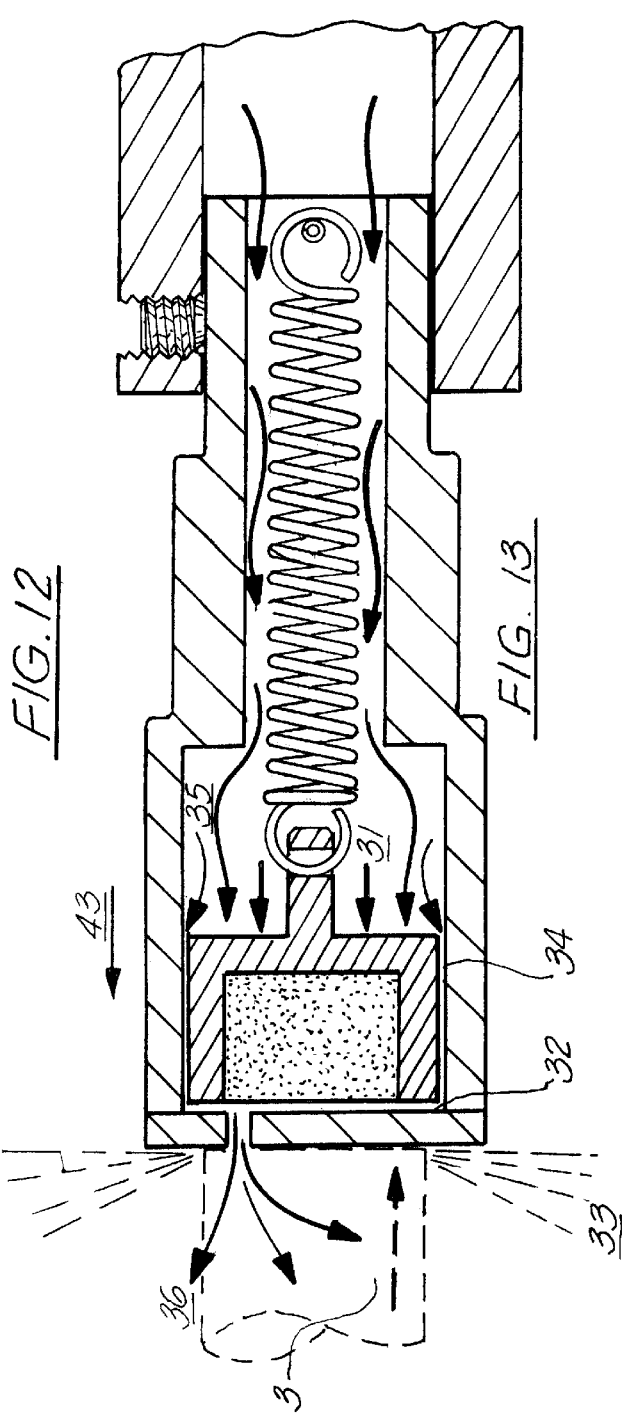
FIG. 13 illustrates the fluid pressure from the coolant urging the piston towards the second end of the bar puller, against cap, to provide a strong magnetic field in the vicinity of the cap, to engage a bar (in phantom).

Continuing with FIGS. 12 and 13, piston 25 containing the magnet 26 is generally held away from the second end 16 of the bar puller body via spring 22, so that no substantial magnetic attraction is present at the second end 16 of the body of the bar puller B. Referring to FIGS. 6–9 and 12–13, when it is desired to engage a bar 3 for pulling same from the chuck 2 in order to form a portion of same via tool on the turret lathe, an exemplary procedure utilizing the bar puller of the present invention may comprise the following.

1) the bar puller is secured to tool station 6' on the turret lathe, and, preferably, external coolant points 39 which might exist for that tool station are closed, assuring maximum fluid flow and pressure through the bar puller, to insure the desired piston movement;

2) if the lathe does not have the turret fluid flow feature, coolant may be selectively provided to the longitudinal bore in the bar puller via exterior plug 37 (FIG. 12).

Figure 7:
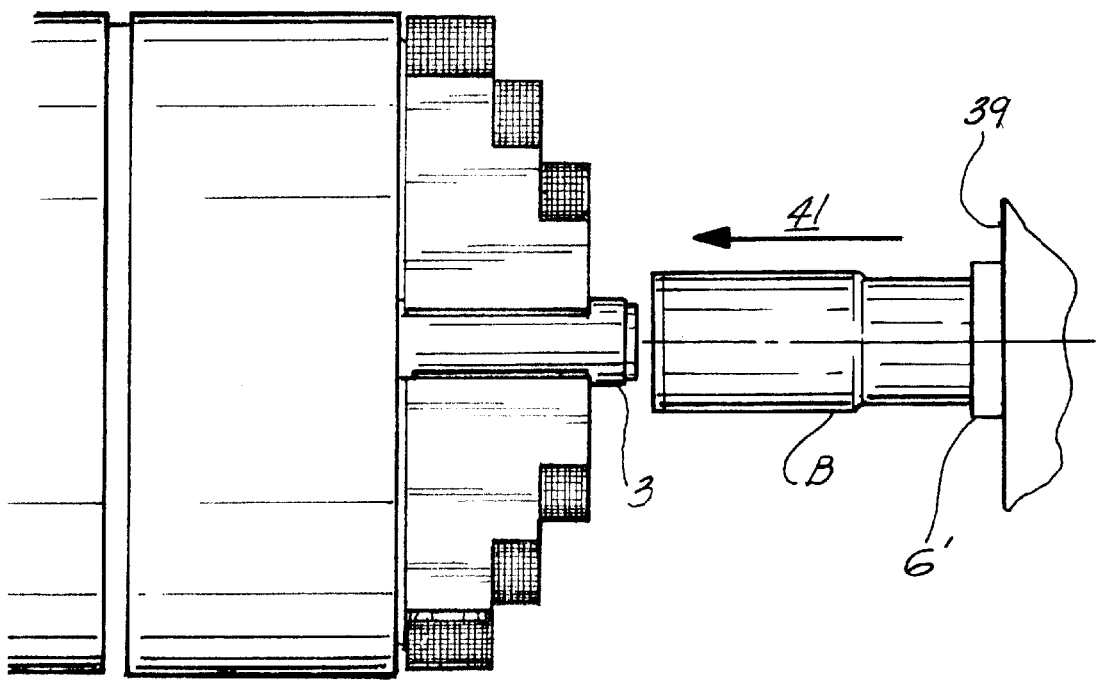
FIG. 7 is a side view of the invention of FIG. 6, further illustrating the rotary turret section of the lathe maneuvering the bar puller to a bar dispenser portion of the lathe.
Figure 8:
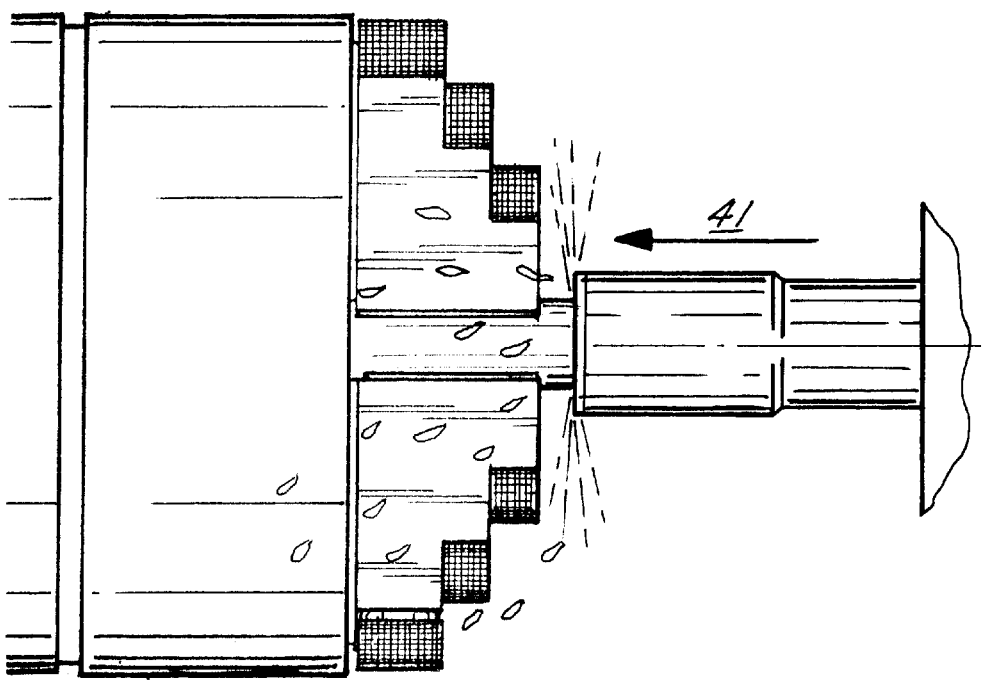
FIG. 8 is a side view of the invention of FIG. 7, illustrating the engagement of a bar from the bar dispenser portion of the lathe to the bar puller.
Figure 9:
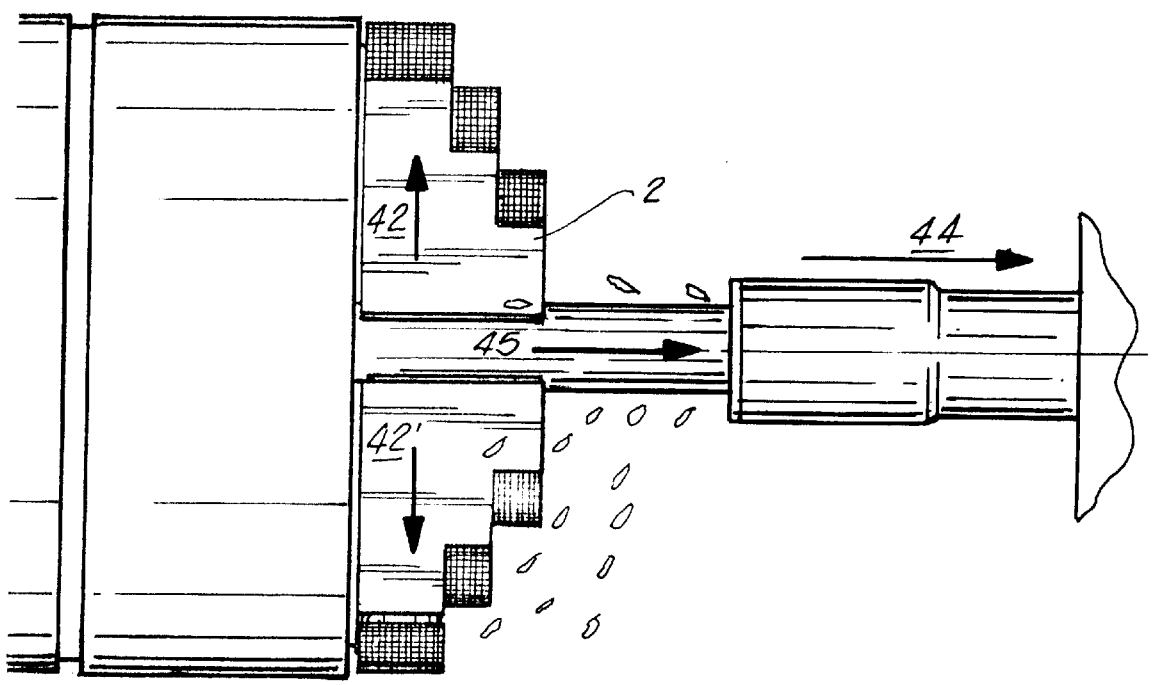
FIG. 9 is a side view of the invention of FIG. 8, illustrating the rotary turret section of the lathe pulling the bar puller and engaged bar from the dispenser portion of the lathe for machining.

3) referring to FIG. 7, the bar puller B is positioned (via the carriage) adjacent to 41 (about 0.020 to 0.050 inch, for example) the bar 3, which bar is protruding about 1/8", for example, from the chuck.

4). Referring to FIGS. 8, 9 and 12–13, turret coolant flow 40 is initiated, which flows into the longitudinal bore 19 in the body 14 of the bar puller B, the flow increasing fluid pressure 30 within the bore, urging 31 piston 25 to overcome the spring bias 29, forcing piston towards 43 the second end 16 of the bar puller, and against 32 the back of cover 27, the fluid flow further traversing 35 piston clearance 35 between the piston OD and the longitudinal bore ID, where the fluid passes 36 through the drain aperture 28 formed in cover 27.

With the fluid flow, the piston 25 is urged to an engagement position with the magnet 26 adjacent to the back of cover 27, thereby providing an electromagnetic field 33 in the vicinity of the second end 16 of the bar puller and through the cover 27, so as to engage bar 3, thereby allowing bar puller B to pull 44 same (via the carriage), urging the bar from the open chuck 2.

Figure 10:
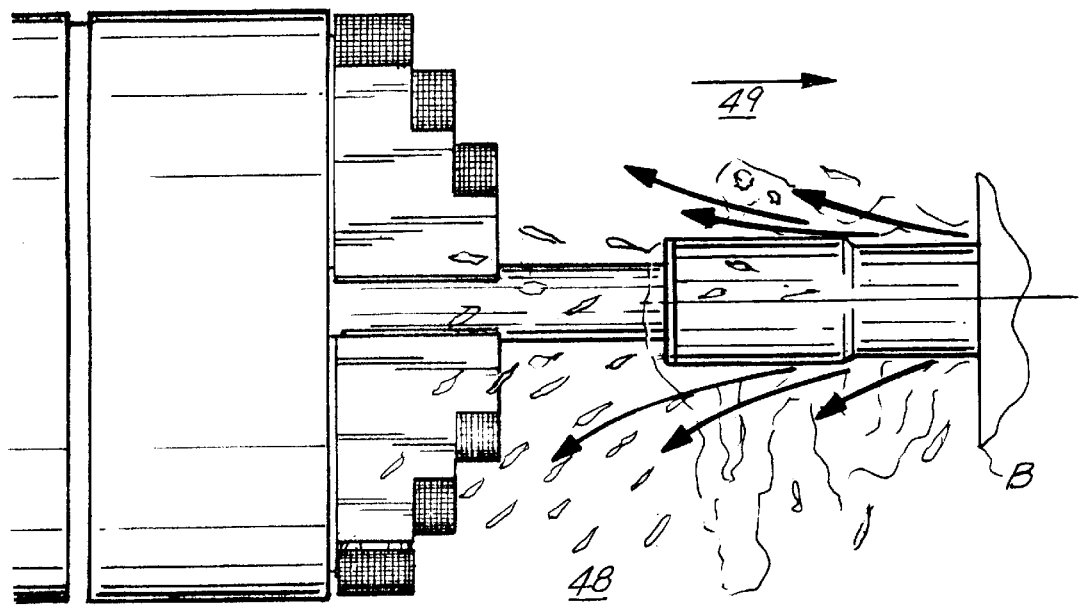
FIG. 10 illustrates the holding of the bar tip in place for machining by machining tool on the lathe.
Figure 11:
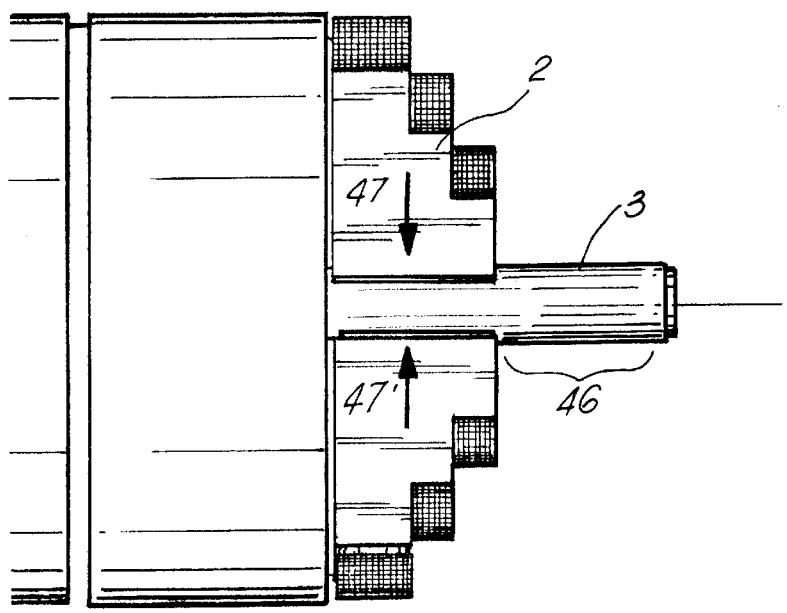
FIG. 11 illustrates the disengagement of the bar puller from the bar after desired machining has occurred.

Continuing with FIGS. 10–11 and 12, once the bar 3 is pulled the desired distance 46 from the chuck 2, the chuck is closed 47, clamping the pipe and isolating same, and fluid flow 48 is ceased, allowing the spring bias 29 to urge the piston 25 away from cover 27, removing magnet 26 from the vicinity of cover 27, and releasing pipe 3 from bar puller B.

The bar puller B is then retracted from the bar to a safe index position, so that another tool station (and installed tool) on the turret lathe may be selected for working upon the exposed bar stock. Once a part has been formed from the exposed bar stock, it should be parted off as close as possible to the chuck, and the bar pulling process may be repeated until the bar stock is depleted, or the desired number of parts are formed.

Referring to FIG. 12, in systems which do not have turret fluid flow capability associated with the tool station, a plug 37 may be provided so that a hose from an exterior coolant pump may be utilized to provide fluid flow into the longitudinal bore of the bar puller, to facilitate magnet positioning as discussed supra.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A puller for pulling stock material, comprising:
   a body having first and second ends and a longitudinal bore, said first end of said body forming an engagement end, said second end of said body forming a mounting end;

a piston slidingly situated in said longitudinal bore, said piston having situated therein a magnet;

fluid pressure means for selectively urging said piston towards said engagement end of said body;

bias means for biasing said piston away from said engagement end of said body when said fluid pressure means is inoperative.

2. The puller of claim 1, wherein said mounting end of said body is mounted to a tool station on a rotating turret lathe.

3. The puller of claim 2, wherein said fluid pressure means comprises a flow of fluid from said tool station, said flow of fluid directed to the longitudinal bore formed in said body at said mounting end of said body, said flow having a pressure sufficient to urge said piston to said engagement end of said body.

4. The puller of claim 2, wherein said body of said bar puller further has an outer surface, said body having formed therethrough a fluid flow aperture for receiving cooling fluid, said fluid flow aperture formed through said outer surface and terminating at the longitudinal bore formed in said body, and wherein said fluid pressure comprises a flow of fluid through said fluid flow aperture into said longitudinal bore formed in said body.

5. The puller of claim 3, wherein said bias means comprises a spring having first and second ends, said spring situated in said longitudinal bore of said body, said first end of said spring engaging said piston, said second end of said spring engaging an anchor situated in the vicinity of the mounting end of said body.

6. A puller for pulling feed material from a chuck of a numerically controlled lathe, said lathe having a rotary turret having multiple tool stations mounted thereupon, said lathe further comprising coolant flow to said tool stations, said puller comprising:

a body having first and second ends and a longitudinal bore therethrough, said first end of said body forming an engagement end, said second end of said body forming a mounting end;

a piston slidingly situated in said longitudinal bore, said piston having situated therein a magnet;

said mounting end of said body formed to engage one of said tool stations and direct coolant flow into the longitudinal bore formed in said body;

said piston being biased such that said piston is situated away from said engagement end when said coolant flow is off, said coolant flow urging said piston to a position adjacent to said engagement end of said body when said coolant flow is on.

7. The method of pulling stock material from a chuck of a numerically controlled lathe, said lathe having opposite said chuck a rotary turret having multiple tool stations, comprising the steps of:

a. providing a bar puller, comprising:

a body having first and second ends and a longitudinal bore therethrough, said first end of said body forming an engagement end, said second end of said body forming a mounting end;

a piston slidingly situated in said longitudinal bore, said piston having situated therein a magnet;

said mounting end of said body formed to engage one of said tool stations and direct a fluid flow into the longitudinal bore formed in said body;

said piston being biased such that said piston is situated away from said engagement end when said fluid flow is off, said fluid flow urging said piston to a position adjacent to said engagement end of said body when said fluid flow is on;

b. mounting said engagement end of said bar puller to a tool station on said rotary turret;

c. providing a length of stock material emanating situated at said chuck;

d. positioning said bar puller such that said engagement end of said bar puller is adjacent to said stock material at said chuck;

e. opening said chuck, releasing said stock material;

f. initiating a fluid flow into said longitudinal bore of said body of said bar puller, urging said piston to a position adjacent to said engagement end of said bar puller;

g. allowing said magnet to engage said stock material at said chuck, providing engaged stock material;

h. pulling said bar puller with said engaged stock material away from said chuck;

i. closing said chuck, so as to grip said stock material;

j. ceasing fluid flow, allowing said bias to urge said piston away from said engagement end of said bar puller, so as to release said stock material from said bar puller;

k. positioning said bar puller away from said stock material, so that another tool may process said stock material;

l. repeating steps d–k until the desired stock material is processed.

8. A puller for pulling feed material from a chuck of a numerically controlled lathe, said lathe having a rotary turret having multiple tool stations mounted thereupon, said puller comprising:

a body having first and second ends and a longitudinal bore therethrough, said first end of said body forming an engagement end, said second end of said body forming a mounting end;

a piston slidingly situated in said longitudinal bore, said piston having situated therein a magnet;

said mounting end of said body formed to engage one of said tool stations and direct a fluid flow into the longitudinal bore formed in said body;

said piston being biased such that said piston is situated away from said engagement end when said fluid flow is off, said fluid flow urging said piston to a position adjacent to said engagement end of said body when said fluid flow is on.

9. The method of pulling stock material from a chuck of a numerically controlled lathe, said lathe having opposite said chuck a rotary turret having multiple tool stations, comprising the steps of:

a. providing a bar puller, comprising:

a body having a longitudinal bore and an engagement end;

a piston slidingly situated in said longitudinal bore, said piston having situated therein a magnet;

said piston being biased;

b. mounting said bar puller to a tool station on said rotary turret;

c. providing a length of stock material emanating situated at said chuck;

d. positioning said bar puller such that said engagement end of said bar puller is adjacent to said stock material at said chuck;

e. opening said chuck, releasing said stock material;

f. initiating a fluid flow into said longitudinal bore of said body of said bar puller, urging said piston to a position adjacent to said engagement end of said bar puller;

g. allowing said magnet situated within said piston to engage said stock material at said chuck, providing engaged stock material;

h. pulling said bar puller with said engaged stock material away from said chuck;

i. closing said chuck, so as to grip said stock material;

j. ceasing fluid flow, allowing said bias to urge said piston away from said engagement end of said bar puller, so as to release said stock material from said bar puller;

k. positioning said bar puller away from said stock material, so that another tool may process said stock material;

l. repeating steps d–k until the desired stock material is processed.

10. The method of claim 9, wherein said fluid in step "f" comprises liquid coolant, and wherein after step "h" there is provided the additional step "h1" of draining said liquid coolant from said engagement end of said bar puller onto said stock material, while machining said stock material.

* * * * *